United States Patent
Vahidsafa

(10) Patent No.: US 9,015,460 B2
(45) Date of Patent: Apr. 21, 2015

(54) HYBRID HARDWIRED/PROGRAMMABLE RESET SEQUENCE CONTROLLER

(75) Inventor: Ali Vahidsafa, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 345 days.

(21) Appl. No.: 13/561,859

(22) Filed: Jul. 30, 2012

(65) Prior Publication Data

US 2014/0032887 A1  Jan. 30, 2014

(51) Int. Cl.
  *G06F 1/24*  (2006.01)
  *G06F 11/27*  (2006.01)
(52) U.S. Cl.
  CPC . *G06F 1/24* (2013.01); *G06F 11/27* (2013.01)
(58) Field of Classification Search
  CPC .................................. G06F 11/27; G06F 1/24
  USPC .............................................. 714/733; 713/1
  See application file for complete search history.

(56) References Cited

U.S. PATENT DOCUMENTS

| | | | |
|---|---|---|---|
| 6,560,740 B1 * | 5/2003 | Zuraski et al. | 714/733 |
| 7,260,759 B1 * | 8/2007 | Zarrineh et al. | 714/733 |
| 7,653,845 B2 * | 1/2010 | Hesse et al. | 714/718 |
| 2004/0006729 A1 * | 1/2004 | Pendurkar | 714/733 |
| 2005/0231245 A1 | 10/2005 | Marotta | |
| 2006/0259838 A1 | 11/2006 | Nardini et al. | |
| 2007/0101166 A1 | 5/2007 | Boyum et al. | |

* cited by examiner

*Primary Examiner* — Albert Wang
(74) *Attorney, Agent, or Firm* — Meyertons, Hood, Kivlin, Kowert & Goetzel, P.C.; Stephen J. Curran

(57) ABSTRACT

A processor having a number of functional units includes a hybrid reset sequence controller that includes a master reset controller that may be configured to hierarchically control a sequence of initialization operations performed on the functional units based upon a value stored within a master control register. In addition, the processor may also include a number of additional controllers, each configured to control initialization operations for a respective functional unit based upon a value stored within an additional respective control register. The master reset controller may control each of the additional reset controllers dependent on the value stored within the master control register.

20 Claims, 3 Drawing Sheets

HYBRID HARDWIRED/PROGRAMMABLE RESET SEQUENCE CONTROLLER

BACKGROUND

1. Technical Field

This disclosure relates to processor operation, and more particularly to reset sequencing control of a processor.

2. Description of the Related Art

In a modern processor design, the integration of system on chip (SOC) components and the adoption of dynamic operating voltage and frequency has become commonplace. Accordingly, the reset sequence for such processors has become increasingly complex. Conventional reset sequencers include hardwired designs and fully programmable designs. The hardwired designs, although compact, provide limited flexibility during use in test and debug environments, particularly when bugs are detected late in the design cycle. In contrast, fully programmable sequencers provide a great deal of flexibility. However, these fully programmable sequencers may consume an unacceptably large area on a die. In addition, these fully programmable sequencers typically utilize a separate processor or microcontroller which is initialized with code that is loaded before performing a reset.

SUMMARY OF THE EMBODIMENTS

Various embodiments of a hybrid reset sequence controller are disclosed. In one embodiment, a processor includes a number of functional units such as execution units, memory units, clock generation units and the like. The processor may also include a control unit that includes a master reset controller that may be configured to hierarchically control a sequence of initialization operations performed on the functional units based upon a value stored within a master control register. In addition, the processor may also include a number of additional controllers, each configured to control initialization operations for a respective functional unit based upon a value stored within an additional respective control register. The master reset controller may be further configured to control each of the additional reset controllers dependent on the value stored within the master control register.

Figure 1:
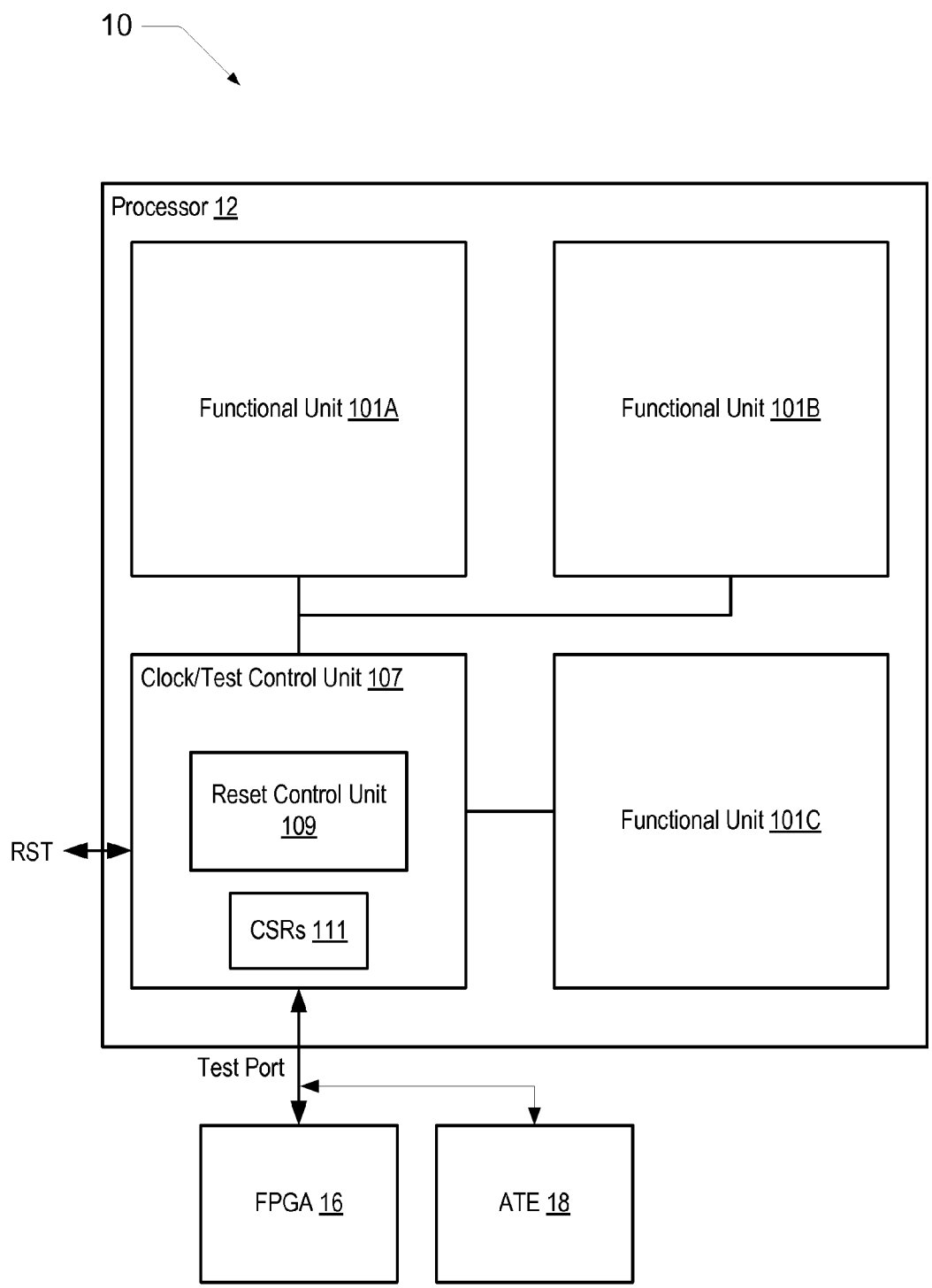
FIG. 1 is a block diagram of one embodiment of a system including a processor with a hybrid reset controller.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a block diagram of one embodiment of a system including a processor with a hybrid reset controller is shown. The system 10 includes a processor 12 that is coupled to a device test system such as automated test equipment (ATE) 18 and to a field programmable gate array (FPGA) 16 via a test port.

In one embodiment, the test port may be representative of a test access port that operates according to the IEEE 1149.1 standard. This type of port is commonly referred to as a joint test action group (JTAG) port. In other embodiments, other types of test access ports may be implemented.

The ATE 18 may be any type of test system used to test devices. For example, the ATE 18 may be a computer system that executes test program instructions which may control all or part of the operation of the processor 12. In particular, as described in greater detail below, ATE 18 may execute instructions that provide the test access port with instructions which program control and status registers (CSRs) within the processor 12 to control, for example, the reset and initialization of the processor 12, among other things.

Similarly, in one embodiment the FPGA 16 may be a device that executes specific instructions to program the test port and provide instructions which program CSRs within the processor 12 to control, for example, the reset and initialization of the processor 12.

The processor 12 includes a number of functional units designated here as 101A, 101B, and 101C. In various embodiments, the functional units may be representative of any of a variety of functional blocks of a processor. For example, functional unit 101A may be representative of one or more execution pipelines and the associated execution units. The functional unit 101B may be representative of a memory unit such as a cache memory including a memory built-in self-test unit, for example. Further, functional unit 101C may be representative of an e-Fuse unit, or a clock generation unit, for example. In addition, processor 12 includes a clock/test control unit 107 which is coupled to all of the functional units.

As mentioned above and described in greater detail below, complex processors may include many steps during initialization. For example, during a power-on reset (POR) certain steps may occur which do not occur during a warm reset (WMR). In addition, there may be a number of different warm resets that pertain to particular functional blocks. Further, many of the initialization steps occur in a prescribed sequence in different parts of a processor. Accordingly, reset sequencers are used to control the reset and initialization process. However, to facilitate both extended functionality and debug capability, and compactness (e.g., area) in design, a hybrid reset sequencer is used in processor 12. More particularly, the hybrid sequencer uses CSRs which have a (hardwired) default value coming out of reset which should make the processor operate properly. Generally, a CSR may control the operation of the processor, or it may provide status information such as status flags, or it may provide both control and status indications. Typically, CSRs may be hardwired to have a default value coming out of reset. However, to facilitate device test, debug of silicon, and/or hardware patches in the field, each of the CSRs may also be programmed via the test port using a general purpose computer (not shown), an ATE 18, or an FPGA 16 as described above. Thus, no additional hardware or programming infrastructure is necessary to configure the reset sequence.

Figure 2:
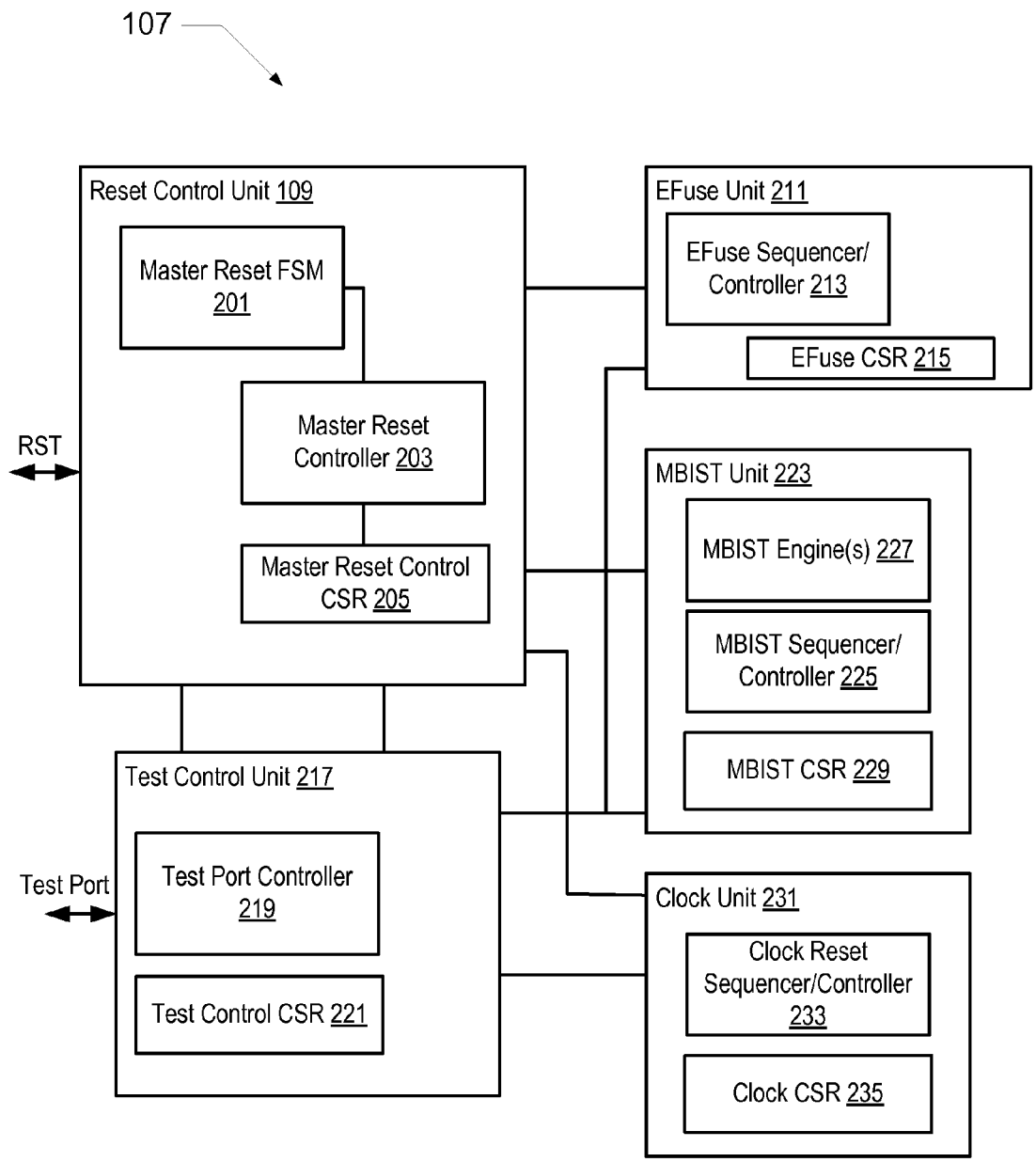
FIG. 2 is a block diagram of one embodiment of the reset controller of FIG. 1.

Thus, the clock/test control unit 107 includes a reset control unit 109 and a number of CSRs 111. The reset control unit 109 may be configured to hierarchically control a sequence of initialization operations performed on the functional units 101 based upon a value stored within a master control register (e.g., CSR 205 of FIG. 2). As shown in FIG. 2, the clock/test control unit 107 also includes a number of additional reset controllers, each of which may be configured to control initialization operations for a respective functional unit based upon values stored within an additional respective control register (e.g., 235 of FIG. 2). Accordingly, as described in greater detail below, the reset control unit 109 may sequentially step through the master control register value to activate and control the additional reset controllers in a hierarchical way.

Referring to FIG. 2, a block diagram of one embodiment of the clock/test control unit of FIG. 1 is shown. The clock/test control unit 107 includes a reset control unit 109, which is coupled to a test control unit 217, a clock unit 231, an MBIST unit 223, and an EFuse unit 211, and to which and an external Reset (RST) pin is coupled. In addition, the test port is coupled to the test control unit 217.

As shown in FIG. 2, the reset control unit 109 includes a master reset finite state machine (FSM) 201, a master reset controller 203, and a master reset control CSR 205. In one embodiment, the FSM 201 maintains and controls the reset state of the processor 12. The master reset controller 203 serves as a master reset sequencer by accessing the master reset control CSR 205 and sequentially stepping through the value stored therein. In various embodiments, the processor 12 may include one or more external reset pins (shown as RST in FIG. 1 and FIG. 2), which when asserted, may cause the processor 12 to enter one or more reset conditions such a POR or a WMR, for example. By pulsing the reset pins(s), the CSRs may load their default values, and the sequencers to self-initialize. The FSM 201 may begin executing the "program" represented by the CSR values. However, as described further below, the default CSR values may be changed prior to the sequencers executing a particular CSR value. In one embodiment, the value stored in the master reset control CSR 205 may be grouped into a number of groups of bits, and each group may correspond to a respective functional unit.

For example, some bits of each group may activate or deactivate (i.e., skip) the corresponding reset controller, while another bit may enable or disable an interlock capability which may allow for stopping the reset sequence when a corresponding sequencer finishes or starts its sequence, for example. It is noted that the bits in a group may have a number of encodings in which each encoding may provide specific functionality. For example, in one embodiment, an encoding of all ones may indicate to skip or deactivate a corresponding controller, while all zeros may activate that controller.

In one embodiment, the master reset controller 203 may sequentially step through the master reset control CSR 205 beginning with bit zero. Depending on the value of each bit or bit group the master reset controller 203 may provide signals to the reset controller of the corresponding functional unit to control initialization, test, and/or operation of the functional unit. In addition, through the use of the interlock feature mentioned above, the test access port may control the pace of execution of the reset sequencing by asserting interlocks for each step of the master reset controller 203. While the FSM 201 is interlocked, one or more CSR values may be programmed through the test access port, thereby changing default operation dynamically during execution of the sequences.

More particularly, in FIG. 2, the EFuse unit 211 includes an EFuse sequencer controller 213 and an EFuse CSR 215. Accordingly, in response to the bits in the master reset control CSR 205 indicating that the EFuse unit 211 is active, the master reset controller 203 may provide one or more signals to the EFuse unit 211 to effectively initiate operation of the EFuse sequencer controller 213. As such, the EFuse sequencer controller 213 may access the EFuse CSR 215 to determine and control the operation of the EFuse unit 211. For example, in one embodiment, dependent on the value in the master reset control CSR 205 the master reset controller 203 may direct the EFuse sequencer controller 213 to clear any EFuses and reload the EFuse values. Alternatively, the values may be cleared, and new values may be loaded through, for example, the test port by halting the sequencer (using another bit in the master reset control CSR 205) after clearing the values.

In addition, the MBIST unit 223 includes an MBIST sequencer controller 225 and an MBIST CSR 229. Similar to the EFuse unit 211, the MBIST unit 223 may also be activated and controlled dependent upon the value in the master reset control CSR 205.

More particularly, the MBIST unit 223 may be directed to initiate or start tests on all or a portion of the memory blocks in the processor 12. For example, the value within the master reset control CSR 205 may cause the master reset controller 203 to provide signals to the MBIST sequencer controller 225 to start, stop or otherwise control testing using the MBIST engines 227 through the MBIST CSR 229.

In the illustrated embodiment, the Clock unit 231 includes a clock reset sequencer controller 233 and a clock CSR 235. Again, similar to the operation of the MBIST unit 223 and the EFuse unit 211, the clock unit 211 may be activated by the master reset controller 203 dependent upon the value in the master reset control CSR 205. For example, a number of clocks both global and local may controlled (e.g., started and stopped) for a number of logic blocks through the clock reset sequencer controller 233 and the clock CSR 235. In addition, one or more clocks may be stopped and/or started and then the master reset controller 203 may be halted, while other operations and/or tests are performed.

In one embodiment, the test control unit 217 includes a test port controller 219 and a test control CSR 221. The test control unit 217 is also coupled to the test port. As described above, the CSRs shown in FIG. 2, among others, may be accessed and written with new values through the test port. For example, in a test environment, it may be necessary to step through one or more initialization sequences in an interlocked fashion. Accordingly, the master reset control CSR 205 may be programmed so that at either before or after each new functional unit bit group, the sequencer may be halted.

The test port may be programmed to cause any number of operations to occur or code to be executed within the processor 12. In another embodiment, during debug of the processor 12, one or more of the default values stored within the CSRs may be incorrect. The test port may be used to change the CSR values until a satisfactory value is found. In yet another embodiment, if the incorrect CSR values are manufactured into a released version of the processor 12, it may be possible to change the CSR values during the boot up sequence of the processor 12 using the FPGA 16 and the test port. More particularly, the FPGA 16 may be implemented to program the test port to access and rewrite one or more CSR values during boot up and prior to the CSR values being accessed during the POR or other initialization sequence.

Figure 3:
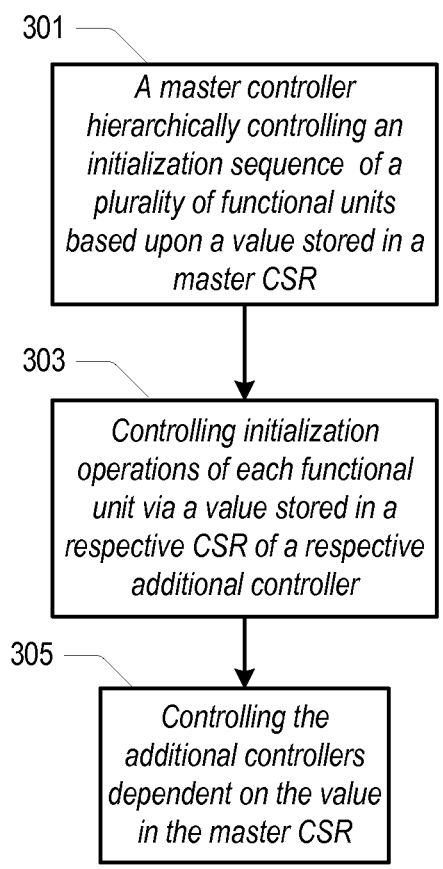
FIG. 3 is a flow diagram depicting operational aspects of one embodiment of the reset controller shown in FIG. 1 and FIG. 2.

In FIG. 3, a flow diagram depicting operational aspects of one embodiment of the reset controller shown in FIG. 1 and FIG. 2 is shown. Referring collectively to FIG. 1 through FIG. 3 and beginning in block 301 of FIG. 3, the operational flow begins by hierarchically controlling an initialization sequence of a plurality of functional units of a processor based upon a value stored within a master CSR. More particularly, as described above, in conjunction with FIG. 1 and FIG. 2, the master reset controller 203 may sequentially access bits within the master control CSR 205. In block 303 of FIG. 3, initialization operations (and test) of each of the functional units may be controlled by a value stored within a CSR of an additional respective controller that corresponds to each functional unit. More particularly, as shown in FIG. 2, there is an additional initialization controller (e.g., 233, 225, 213) and at least one CSR (e.g., 235, 229, 215) for each functional unit. Once the master reset controller 203 activates a given additional controller based on the value in the master control CSR 205 (block 305), each additional controller may use the value in the additional CSR to operate the corresponding functional unit.

Accordingly, the master reset controller 203 in combination with the additional controllers forms a hierarchical hybrid reset/initialization mechanism. The hybrid hardwired/programmable mechanism is hardwired in the sense that there are default values in the CSRs that control the reset sequencing, but it is also programmable as necessary through the existing test port. Thus, the blend of hardwired and programmable control allows for a hybrid design to be compactly created since the logic for the mechanism resides primarily in the sequencer/controller units, and the programmability comes from the existing CSR programmability through the test access port.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
  a plurality of functional units;
  a control unit coupled to the plurality of functional units, wherein the control unit includes a master reset controller configured to hierarchically control a sequence of reset and initialization operations performed on the plurality of functional units based upon a value stored within a master control register;
  wherein the control unit further includes a plurality of additional reset controllers, each configured to control reset and initialization operations for a respective functional unit based upon a value stored within an additional respective control register; and
  wherein the master reset controller is further configured to control each of the additional reset controllers dependent on the value stored within the master control register.

2. The processor of claim 1, wherein the value stored within the master control register includes a plurality of groups of bits, each group of bits corresponding to a respective additional reset controller, wherein the master reset controller is configured to sequentially activate each of the additional reset controllers dependent upon the value stored within the corresponding group of bits of the master control register.

3. The processor of claim 1, further comprising a master reset finite state machine configured to maintain a state of each of the functional units and to determine which initialization operations are performed during operation in each state.

4. The processor of claim 1, wherein each of the of additional reset controllers is configured to perform initialization operations for a respective functional unit based upon a value stored within the additional respective control register in response to being activated by the master reset controller.

5. The processor of claim 1, wherein the value stored within the master control register and the value stored within each additional respective control register correspond to default values that are initialized upon a normal system initialization.

6. The processor of claim 1, further comprising a test port coupled to the control unit and configured to access and program the master control register and the additional respective control registers in response to receiving test port programming instructions.

7. The processor of claim 6, wherein in response to one or more particular bits of the master control register being programmed to have a particular value during an access via the test port, the master reset controller is configured to halt after specific operations have been performed in the sequence of initialization operations.

8. The processor of claim 6, wherein in response to one or more particular bits of the master control register being programmed to have a particular value during an access via the test port, the master reset controller is configured to skip specific operations in the sequence of initialization operations.

9. The processor of claim 6, wherein the test port programming instructions are provided, during an initialization sequence of the processor, to the test port via a field programmable gate array device coupled to the processor.

10. The processor of claim 6, wherein the test port programming instructions are provided, during an initialization sequence of the processor, to the test port via a device test system.

11. A method comprising:
  controlling a sequence of reset and initialization operations performed on a plurality of functional units based upon a value stored within a master control register;
  controlling reset and initialization operations for a respective functional unit based upon a value stored within an additional respective control register of a respective controller of a plurality of additional reset controllers; and
  controlling each of the additional reset controllers dependent on the value stored within the master control register.

12. The method of claim 11, wherein the value stored within the master control register includes a plurality of groups of bits, each group of bits corresponding to a respective additional reset controller, wherein controlling the sequence of initialization operations includes sequentially activating each of the additional reset controllers dependent upon the value stored within the corresponding group of bits of the master control register.

13. The method of claim 11, wherein controlling initialization operations for a respective functional unit includes performing initialization operations for a respective functional unit based upon a value stored within the additional respective control register in response to being activated by the master reset controller.

14. The method of claim 11, wherein the value stored within the master control register and the value stored within each additional respective control register correspond to default values that are initialized upon a normal system initialization.

15. The method of claim 11, further comprising accessing and programming the master control register and the additional respective control registers in response to receiving programming instructions via a test port.

16. The method of claim 15, further comprising halting initialization operations after specific operations have been performed in the sequence of initialization operations in response to one or more particular bits of the master control register being programmed to have a particular value during an access via the test port.

17. The method of claim 15, further comprising skipping specific operations in the sequence of initialization operations in response to one or more particular bits of the master control register being programmed to have a particular value during an access via the test port.

18. The method of claim 15, further comprising a field programmable gate array device programming the test port during an initialization sequence of the processor.

19. A processor comprising:
a plurality of functional units;
a master reset controller coupled to the plurality of functional units and including a master control register;
a plurality of additional reset controllers coupled to the master reset controller, each including an additional respective control register, wherein each of the additional reset controllers is configured to control a respective functional unit dependent upon a value stored within the additional respective control register;
wherein the master reset controller is configured to sequentially read bits of a value stored within the master control register to control a sequence of reset and initialization operations performed on each of the plurality of functional units by the additional reset controllers.

20. The processor of claim 19, wherein the value stored within the master control register includes a plurality of groups of bits, each group of bits corresponding to a respective additional reset controller.

* * * * *

UNITED STATES PATENT AND TRADEMARK OFFICE
CERTIFICATE OF CORRECTION

PATENT NO. : 9,015,460 B2  
APPLICATION NO. : 13/561859  
DATED : April 21, 2015  
INVENTOR(S) : Vahidsafa Page 1 of 1

It is certified that error appears in the above-identified patent and that said Letters Patent is hereby corrected as shown below:

In the Specification

In columns 3-4, column 3, line 60 – column 4, line 2, delete "For example, . . . controller." and insert the same on Col. 3, Line 59, as the continuation of the same paragraph.

In column 4, lines 39-45, delete "More . . . 229." and insert the same on Col. 4, Line 38, as the continuation of the same paragraph.

In the Claims

In column 6, line 18, in Claim 4, after "the" delete "of".

Signed and Sealed this
Sixteenth Day of February, 2016

Michelle K. Lee
*Director of the United States Patent and Trademark Office*